US012260159B2

(12) United States Patent
Joseph et al.

(10) Patent No.: US 12,260,159 B2
(45) Date of Patent: Mar. 25, 2025

(54) SYSTEM FOR COLLABORATIVE HARDWARE RTL LOGIC TIMING DEBUG IN INTEGRATED CIRCUIT DESIGNS

(71) Applicant: International Business Machines Corporation, Armonk, NY (US)

(72) Inventors: Arun Joseph, Kadugodi (IN); Wolfgang Roesner, Austin, TX (US); Shashidhar Reddy, Bangalore (IN); Sampath Goud Baddam, Ramannager (IN); Anthony Saporito, Highland, NY (US); Matthias Klein, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 17/567,598

(22) Filed: Jan. 3, 2022

(65) Prior Publication Data
US 2023/0214564 A1    Jul. 6, 2023

(51) Int. Cl.
*G06F 30/327*  (2020.01)
*G06F 111/02*  (2020.01)
*G06F 119/12*  (2020.01)

(52) U.S. Cl.
CPC ........ *G06F 30/327* (2020.01); *G06F 2111/02* (2020.01); *G06F 2119/12* (2020.01)

(58) Field of Classification Search
CPC . G06F 30/327; G06F 2119/12; G06F 2111/02
(Continued)

(56) References Cited

U.S. PATENT DOCUMENTS 6,132,109 A * 10/2000 Gregory .................. G06F 30/30
                                                       717/139
6,212,666 B1 * 4/2001 Gohl ...................... G06F 30/3312
                                                       716/108
(Continued)

FOREIGN PATENT DOCUMENTS

CN    110912982 A    3/2020
CN    110659515 B    9/2020
(Continued)

OTHER PUBLICATIONS

Roesner, W., "Aspect-Oriented Design—Optimizing SoC Verification via Separation of Concerns", 51st Design Automation Conference, Austin, 2014, 21 pages.
(Continued)

*Primary Examiner* — Jack Chiang
*Assistant Examiner* — Suchin Parihar
(74) *Attorney, Agent, or Firm* — Scully, Scott, Murphy & Presser, P.C.

(57) ABSTRACT

A method, programming product, and/or system is disclosed for identifying flaws in integrated circuits, e.g., processors, that includes: selecting from a list of a plurality of timing issues in an integrated circuit, where each timing issue on the list is represented by one or more VHDL code lines, a particular timing issue to investigate; tracing back the selected one or more VHDL code lines, corresponding to the selected particular timing issue to investigate, to one or more selected physical design VHDL (PD-VHDL) code lines; logically navigating across the one or more selected PD-VHDL code lines to one or more corresponding normalized VHDL (NVDHL) code lines; and tracing back the one or more corresponding NHVDL code lines to one or more short-hand VHDL (SVHDL) code lines to identify one or (Continued)

more code lines, written by a code designer, responsible for the particular timing issue being investigated.

20 Claims, 9 Drawing Sheets

(58) Field of Classification Search
USPC .......................................................... 716/104
See application file for complete search history.

(56) References Cited

U.S. PATENT DOCUMENTS

| | | | | |
|---|---|---|---|---|
| 7,337,100 | B1* | 2/2008 | Hutton | G06F 30/39 |
| | | | | 716/108 |
| 7,483,825 | B2 | 1/2009 | Van Huben et al. | |
| 8,661,394 | B1* | 2/2014 | Frederick | G06F 30/34 |
| | | | | 716/126 |
| 8,745,560 | B1 | 6/2014 | Bhardwaj et al. | |
| 9,189,591 | B2* | 11/2015 | Segal | G06F 30/398 |
| 10,635,769 | B1* | 4/2020 | Skalicky | G06F 30/398 |
| 10,831,955 | B1* | 11/2020 | Cooke | G06N 3/045 |
| 11,966,677 | B1* | 4/2024 | Goveas | G06F 30/3312 |
| 2002/0100001 | A1* | 7/2002 | Lai | G06F 30/33 |
| | | | | 716/103 |
| 2007/0005321 | A1 | 1/2007 | Alfieri | |
| 2010/0257494 | A1* | 10/2010 | Pouarz | G06F 30/3323 |
| | | | | 716/111 |
| 2019/0286763 | A1* | 9/2019 | Kastner | G06F 30/3312 |
| 2019/0311085 | A1* | 10/2019 | Kipnis | G06F 30/3312 |
| 2020/0074276 | A1* | 3/2020 | Cooke | G06N 3/08 |
| 2020/0218788 | A1 | 7/2020 | Todd et al. | |
| 2022/0012164 | A1* | 1/2022 | Grymel | G06F 11/277 |
| 2023/0080463 | A1* | 3/2023 | Joseph | G01R 31/31704 |
| | | | | 714/724 |

FOREIGN PATENT DOCUMENTS

| | | |
|---|---|---|
| TW | 201508488 A | 3/2015 |
| WO | 2020086053 A1 | 4/2020 |

OTHER PUBLICATIONS

Roesner, W., "Software methods Meet Large-Scale System-on-a-Chip-Design", TCE 2015, 28 pages.

Safieddine, M. H., et al., "Verification at RTL Using Separation of Design Concerns", IEEE Transactions on Computer-Aided Design of Integrated Circuits and Systems, Aug. 2019, pp. 15-29-1542, vol. 38, No. 8.

Adler, O., et al., "Facilitating Timing Debug by Logic Path Correspondence", 2014 Design, Automation & Test in Europe Conference & Exhibition, Date of Conference: Mar. 24-28, 2014 , 6 pages.

Nahir, A., et al., "Post-Silicon Validation of the IBM POWER8 Processor", DAC '14, Jun. 1-5, 2014, 6 pages, San Francisco, CA.

"A Tutorial on Cadence's LWB to create and simulate a Half-Adder logic circuit", printed on Dec. 16, 2021, 35 pages, 6. http://users.encs.concordia.ca/~ted/LWB/lwbtutorial.html.

Joseph, A., et al., "Rapidly Building Next Generation Web-based EDA Applications and Platforms from Legacy Tools", Design Automation Conference, 2018 6 pages.

Safieddine, M. H., et al., "Methodology for Separation of Design Concerns Using Conservative RTL Flipflop Inference", DVCon, San Jose, 2015, 8 pages.

Wile, B., et al., "Comprehensive Functional Verification: The Complete Industry Cycle", Morgan Kaufmann Publishers Inc., San Francisco, CA 2005, book.

\* cited by examiner

SYSTEM FOR COLLABORATIVE HARDWARE RTL LOGIC TIMING DEBUG IN INTEGRATED CIRCUIT DESIGNS

BACKGROUND

The disclosure herein relates generally to the field of integrated circuit design, testing, and debug, and more particularly, to methods, apparatuses, and/or systems to test, verify, identify faulty code, and debug integrated circuit designs, including more specifically microprocessors and systems-on-a-chip (SoC).

As the complexity of microprocessors and other large scale integrated circuits has increased over the years, the resources devoted to design verification have accounted for an increasingly large percentage of the total resources to develop and manufacture such integrated circuits. Verifying the proper functionality of advanced microprocessors having multiprocessing capability is now estimated to consume potentially more time, labor, and resources than actual designing such devices.

In the microprocessor design cycle, there is an ever increasing need to reduce the time from hardware lab to general availability of the systems. This motivates faster turnaround time for resolving any issues seen in the integrated circuit, e.g., the processor or SoC design. The testing, verification, and debugging of processor designs typically has been implemented in stages, with there being pre-silicon debug stages and post-silicon debug stages. To find hardware and/or software problems it is known to run "test cases" on a software model version of a processor (called pre-silicon verification or pre-silicon debug). Microprocessor Pre-Silicon functional verification (FV) is typically accomplished by supplying test templates into an automated test case generation tool which produces assembly level instruction sequences that are used as stimuli. Faulty behavior of the design is detected by driving the stimuli into a design simulator and comparing the actual behavior of the design with the expected behavior implied by the input stimuli.

In the post-silicon stage, debugging hardware lab issues is challenging. Debugging hardware is difficult and time-consuming. It would be advantageous to decrease the time for testing microprocessors and SoC designs, including increasing the efficiency of hardware debug of processors and SoC designs. It would be advantageous to efficiently identify faulty code and be able to obtain additional information or annotations regarding the faulty code as a tool to assist in debugging the code.

SUMMARY

The summary of the disclosure is given to aid understanding of systems, platforms, and/or techniques to test and debug integrated circuits (e.g., microprocessors and systems-on-a-chip (SoC) designs), and in an aspect identify flaws in the code and/or other hardware problems and provide the logic designer with information to help debug the integrated circuit, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, platforms, techniques, and/or methods for testing, verifying, and identifying bugs (e.g., faulty, or flawed code) in integrated circuits, microprocessors and/or SoC designs to achieve different effects.

A system, platform, computer program product, and/or technique according to one or more embodiments for identifying flaws (e.g., bugs) in integrated circuits, microprocessors and/or SoC designs is disclosed, and in one or more embodiments identifying flaws and/or bugs to assist in the debug process (including for example providing further information regarding the flaws to assist the logic designer). In one or more approaches the system, platform, tool, computer program product, and/or method includes identifying flaws in an integrated circuit by: selecting from a list of a plurality of timing issues in an integrated circuit, where each timing issue on the list is represented by one or more VHDL code lines, a particular timing issue to investigate; tracing back the one or more VHDL code lines, corresponding to the selected particular timing issue to investigate, to one or more physical design VHDL (PD-VHDL) code lines; logically navigating across the one or more PD-VHDL code lines, corresponding to the selected particular timing issue to investigate, to one or more corresponding normalized VHDL (NVDHL) code lines; and tracing back the one or more corresponding NHVDL code lines to one or more short-hand VHDL (SVHDL) code lines to identify one or more code lines, written by a code designer, responsible for the particular timing issue being investigated. In an aspect, the timing issue with the worst slack time is selected as the particular timing issue to investigate. In one or more embodiments, the integrated circuit was designed through a stepwise refinement-based hardware design process. The list, for example a netlist, identifying the plurality of timing issues is created by server-side computing resources, wherein the list comprises timing slack data for the integrated circuit. In an embodiment, a user, for example via a user computing resources, selects the particular timing issue to investigate.

In an aspect, the system, platform, took, programming product, and/or method includes opening a first source browser in a user computing device and connecting the first source browser to server-side computing resources. In an approach, tracing the one or more VHDL code lines, corresponding to the selected particular timing issue to investigate, to one or more PD-VHDL code lines, includes: obtaining timing slack data for the one or more VHDL code lines being investigated and annotating the one or more VHDL code lines being investigated with the obtained timing slack data to form the one or more PD-VHDL code lines. Obtaining timing slack data for the one or more VHDL code lines being investigated can include: requesting, by the first source browser from the server-side computing resources, the timing slack data for the one or more VHDL code lines being investigated and returning, by the server-side computing resources, the timing slack data for the one or more VHDL lines being investigated. The system, platform, took, programming product, and/or method in one or more embodiments includes opening in a second source browser the one or more NVHDL code lines corresponding to the one or more PD-VHDL code lines, and optionally includes: opening the one or more PD-VHDL code lines corresponding to the one or more VHDL code lines being investigated in the first browser; navigating by the second source browser a VHDL navigation server to trace back the one or more PD-VHDL code lines to the one or more corresponding NVHDL code lines.

The system, platform, took, programming product, and/or method includes in one or more approaches connecting a third source browser to the server-side computing resources; navigating the server-side computing resources to trace back the one or more corresponding NVHDL code lines to the one or more SVHDL code lines; and opening the one or more SVHDL code lines in the third source browser. In a further aspect, after identifying the one or more code lines, written by a code designer, responsible for the particular timing issue being investigated, the system, platform, took, programming product, and/or method can further include obtaining additional information on the particular timing issue being investigated, wherein obtaining additional information on the particular timing issue being investigated includes: connecting an additional server to the server-side computing resources; receiving, by the additional source browser, a signal source to trace back; requesting, by the additional source browser, the server side computing resources to trace back the signal source to a next layer of VDHL code; receiving, by the additional source browser, from the server-side computing resources the next layer of VHDL code; and opening in the additional source browser the next layer of VHDL code. In an example, the signal source is one or more SVHDL code lines and the next layer of VHDL code is one or more corresponding NVHDL code lines.

In an aspect a system for identifying flaws in a processor is disclosed where the system includes: a non-transitory memory storage device storing program instructions; and one or more processors having circuitry and logic to execute said program instructions, wherein the one or more processors are in communication with said memory storage device and in response to executing said program instructions the one or more processors are configured to: select from a list of a plurality of timing issues in the processor, where each timing issue on the list is represented by one or more VHDL code lines, a particular timing issue to investigate; trace back the one or more VHDL code lines, corresponding to the selected particular timing issue to investigate, to one or more physical design VHDL (PD-VHDL) code lines; logically navigate across the one or more PD-VHDL code lines, corresponding to the selected particular timing issue to investigate, to one or more corresponding normalized VHDL (NVDHL) code lines; and trace back the one or more corresponding NHVDL code lines to one or more short-hand VHDL (SVHDL) code lines to identify one or more code lines, written by a code designer, responsible for the particular timing issue being investigated. In an embodiment, the program instructions, in response to being executed by the one or more processors, further configures the one or more processors to: open a first source browser in a user computing device; and connect the first source browser to server-side computing resources. In a further embodiment, the program instructions, in response to being executed by the one or more processors, further configures the one or more processors to: request, by the first source browser from a design data server, the timing slack data for the one or more VHDL code lines being investigated; and return, by the design data server, the timing slack for the one or more VHDL code lines being investigated, wherein the server-side computing resources comprises the design data server and the design data server stores hardware design data on the processor being investigated, wherein the hardware design data comprises a Netlist of the current stage of the processor design, RTL design data, compiled designs, RTL transforms, logic simulation data, Physical netlist Design (PD) in a concise binary form (DD), and post-silicon hardware dumps.

In an approach, the program instructions, in response to being executed by the one or more processors, configures the one or more processors to: obtain timing slack data for the one or more VHDL code lines being investigated; annotate the one or more VHDL code lines being investigated with the obtained timing slack data to form the one or more PD-VHDL code lines; and open the one or more PD-VHDL code lines in the first source browser. In a further approach, the program instructions, in response to being executed by the one or more processors, configures the one or more processors to: open a second source browser in the user computing device; connect the second source browser to the design data server; connect the second source browser to a VHDL navigation server; trace back the one or more PD-VHDL codes lines to the one or more corresponding NVHDL code lines by navigating the VHDL navigation server with the second source browser; and open the one or more corresponding NVHDL code lines in the second browser, wherein the server-side computing resources comprises the VHDL navigation server and the VHDL navigation server stores code description including hardware logic design, wherein the hardware logic design comprises VHDL, Verilog, and All Event Trace (AET) data. In a further embodiment, the program instructions, in response to being executed by the one or more processors, configures the one or more processors to: open a third source browser in the user computing device; connect the third source browser to the design data server; connect the third source browser to the VHDL navigation server; trace back the one or more corresponding NVHDL codes lines to the one or more corresponding SVHDL code lines by navigating the VHDL navigation server with the third source browser; and open the one or more corresponding SVHDL code lines in the third browser.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, products, instruction programming, platforms, and/or systems for identifying flaws and/or bugs in integrated circuits, microprocessors, and/or System-On-A-Chip (SoC) designs, including for example identifying faulty code, will be better understood when read in conjunction with the figures provided. It may be noted that a numbered element in the figures is typically numbered according to the figure in which the element is introduced, is typically referred to by that number throughout succeeding figures, and that like reference numbers generally represent like parts of exemplary embodiments of the invention. Embodiments are provided in the figures for the purpose of illustrating aspects, features, and/or various embodiments of the methods, techniques, products, programming, platforms, and/or systems for testing integrated circuits, microprocessors, and/or SoC designs, including identifying flaws and/or bugs in the integrated circuits, microprocessors, and/or Soc designs (e.g., in the code), but the claims should not be limited to the precise arrangement, structures, features, aspects, assemblies, subassemblies, systems, platforms, circuitry, functional units, programming, instructions, embodiments, methods, processes, or devices shown. The arrangements, structures, features, aspects, assemblies, subassemblies, systems, platforms, circuitry, functional units, programming, instructions, embodiments, methods, processes, and/or devices shown may be used singularly or in combination with other arrangements, structures, features, aspects, assemblies, subassemblies, systems, circuitry, functional units, programming, instructions, methods, processes, and/or devices.

DETAILED DESCRIPTION

Figure 1:
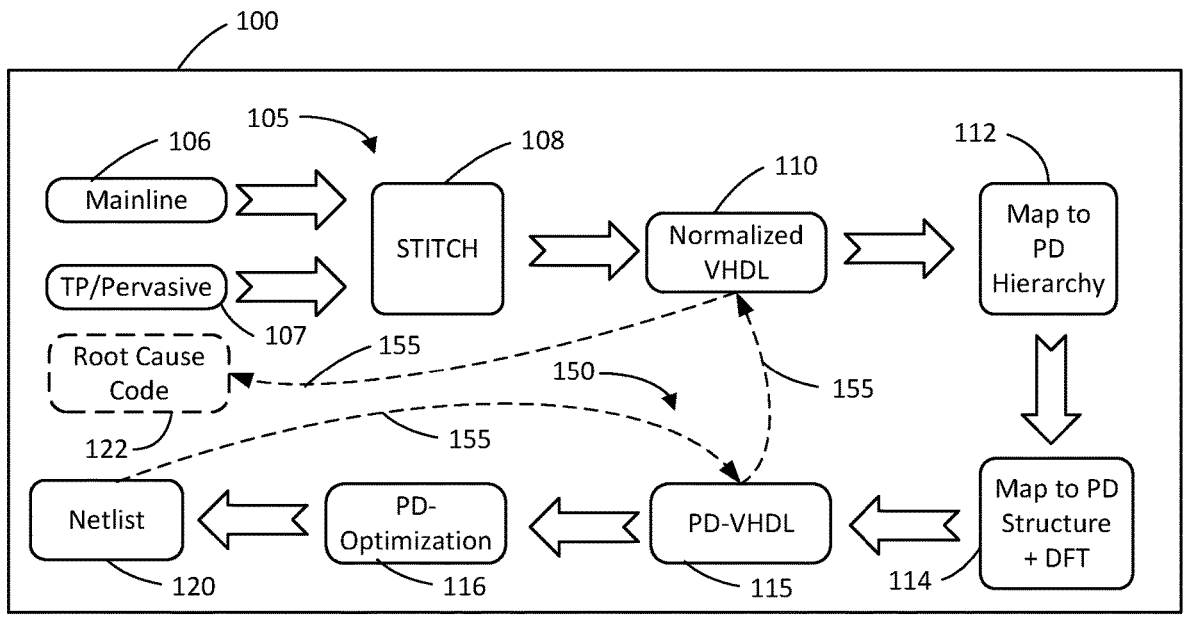
FIG. 1 is a flow chart showing a stepwise refinement development process for designing integrated circuits, microprocessors, and/or systems-on-a-chip (SoC) designs and a complementary reverse engineering process to identify flaws in such integrated circuits, microprocessors, and/or systems-on-a-chip (SoC) designs, according to an embodiment of the present disclosure.

The following description is made for illustrating the general principles of the invention and is not meant to limit the inventive concepts claimed herein. In the following detailed description, numerous details are set forth in order to provide an understanding of methods, techniques, programming, products, platforms, and systems for identifying flaws and/or bugs (e.g., faulty code) in integrated circuits, microprocessors, and/or SoC, and in an embodiment in integrated circuit designs (e.g., processors) developed using a step-wise refinement development process, however, it will be understood by those skilled in the art that different and numerous embodiments of the methods, techniques, programming, products, platforms, and/or systems may be practiced without those specific details, and the claims and disclosure should not be limited to the arrangements, embodiments, features, aspects, systems, assemblies, subassemblies, structures, functional units, circuitry, programming, instructions, processes, methods, or details specifically described and shown herein. In addition, features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a", "an" and "the" include plural referents unless otherwise specified, and that the terms "includes", "comprises", and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes the design development implementation flow process for integrated circuits fabricated on silicon (chips), including processors, microprocessor, and system-on-a-chip (SoC) designs, systems, and architectures, which are apparent to those skilled in the art. It is assumed that those skilled in the art are familiar with integrated circuit development techniques, including testing and design verification of processors and the identification of flaws, bugs, and/or faulty code as well as debugging such flaws, bugs, and/or faulty code.

In the microprocessor (also referred to as a processor) design cycle there is an increasing need to reduce the time from hardware lab to commercial introduction of the processor. There is a need for increased efficiency in the testing and debugging of processor designs which motivates faster turnaround times to identify and debug any issues in the processor, including in the post-silicon hardware lab. Debugging hardware lab issues are challenging. It would be beneficial to have an improved process for identifying flaws, issues, bugs, and/or other problems that require debugging to increase efficiency and shorten the time and lessen the expense associated with commercial release of processor designs.

Disclosed is a system, platform, computer program product, and/or process for identifying bugs, flaws, and/or faulty code in integrated circuits, including in processors and SoC designs. In one or more embodiments, the new system, platform, computer program product, and/or process utilizes a cloud native electronic design automation (EDA) platform, and further supports normalized (NMZ) register transfer level (RTL) to capture the design intent and a set of automated transforms for creation of physical design (PD) optimized RTL. In an approach, a system, platform, computer program product, and/or process is disclosed that has the ability to translate hardware design data from multiple formats and transform source data and input from a stepwise refinement implementation used to develop integrated circuit (processor) designs to identify flaws in the integrated designs in a seemingly single session.

Next generation, high-performance microprocessors are now designed using a stepwise refinement implementation flow. In the stepwise refinement development process, normalized (NMZ) RTL, which captures the design intent, goes through a set of automated transforms to create an optimized physical design (PD) RTL. The optimized (PD) RTL goes through physical design and is manufactured. This new stepwise refinement development process using electronic design automation (EDA) has created a need to develop a testing, verification, and debug process that takes into account and is collaborative with the new stepwise refinement development process.

According to one or more embodiments, a cloud-native EDA platform for collaborative hardware logic design and debug is disclosed, where according to an aspect EDA tools and hardware design data co-exist as scalable, on-demand microservices. A microservice architecture arranges an application as a collection of loosely coupled services. In a microservices architecture, services typically are fine-grained, and the protocols are lightweight. The goal is that teams and/or different users can bring their services or work (e.g., their design and/or debug services) to life independent of others. In an approach, platform web applications leverage these microservices to provide new hardware design experiences, like "session-based" design and debug (e.g., including identifying the faulty code). The platform data sources span across the hardware stepwise refinement design processes and includes RTL design data, compiled designs, RTL transforms, logic simulation data, Physical netlist Design (PD) in a concise binary form, and additional information from post-silicon hardware dumps. The platform capabilities, in one or more embodiments uniquely complements the stepwise refinement implementation flows used for designing the hardware. The platform in one or more embodiments can be used for functional debug, logic-PD co-debug, and post-silicon hardware debug.

FIG. 1 outlines an exemplary flowchart in accordance with an embodiment illustrating and describing an overview method 105 of the physical design (PD) construction, using Aspect Oriented Design (AOD), of integrated circuits, including processors. The overview method 105 illustrates a stepwise refinement flow of designing an integrated circuit (e.g., a microprocessor) starting on the far left where code written by a logic designer (e.g., Mainline 106 and TP/Pervasive boxes 107) is input and proceeding all the way in the direction of the large arrows to the Netlist 120. While the method 105 is described for the sake of convenience and not with an intent of limiting the disclosure as comprising a series and/or a number of steps, it is to be understood that the process 105 does not need to be performed as a series of steps and/or the steps do not need to be performed in the order shown and described with respect to FIG. 1 but the process 105 can be integrated and/or one or more steps can be performed together, simultaneously, or the steps can be performed in the order disclosed or in an alternate order.

The purpose of the stepwise refinement development process 105 is to improve the timing of the logic. The stepwise hardware refinement design process 105 includes engineering steps 108, 112, and 114 performed by electronic design automation (EDA) tools whereas steps 110 and 115 represent analysis points or results of the engineering steps, including the resulting Netlist 120. In stepwise refinement design process 105, the code is inserted along with a hardware dump (boxes 106 and 107) which both undergo engineering (EDA) processes 108 where the data (code and hardware dump) are stitched together to arrive at normalized (NMZ) register-transfer-level (RTL) 110. RTL in digital circuit design is a design abstraction that models a synchronous digital circuit in terms of the flow of digital signals between hardware registers, and the logical operations on those signals. RTL is based on synchronous logic and contains three primary pieces; namely, registers which hold state information, combinatorial logic which defines the nest state inputs, and clocks that control when the state changes.

The RTL design is usually captured using a hardware description language (HDL) such as Verilog or VHDL. HDL refers to Hardware Description Language and is a specialized language used to describe the structure and behavior of electronic circuits, and most commonly digital logic circuits. A Hardware Description Language (HDL) enables a precise, formal description of an electronic circuit that permits for the automated analysis and simulation of an electronic circuit. HDLs form an integral part of electronic design automation (EDA) systems, for example, for application-specific circuits, microprocessor, and programmable logic devices. VHDL is a specific HDL and refers to VHSIC HDL developed for Very High-Speed Integrated Circuit Programs (VHSICs). VHDL has been standardized by IEEE and models the behavior and structure of digital systems at multiple levels of abstraction, ranging from the system level down to the logic gates, for design entry, documentation, and verification purposes.

Normalized RTL 110 (e.g., normalized VHDL) captures the design intent of the integrated circuit (e.g., processor). A normalized (NMZ) RTL does not contain the non-functional specifications (e.g., test, clocking, power structures, power structure and aspects) of the integrated circuit (e.g., the processor). That is, normalized (NMZ) RTL is similar to Physical Design (PD) RTL where the NMZ RTL has only mainline machine function (design intent), and non-mainline aspects like physical aspects of the hardware design are not present in NMZ RTL. NMZ RTL or NMZ VHDL 110 is a smaller and simpler than a Physical Design (PD) RTL model as PD RTL/PD VHDL 115 contains physical aspects of the integrated circuit design (test, clocking, power structures and aspects).

The normalized RTL or normalized VHDL 110 undergoes further engineering processes, e.g., a set of automated transforms: map to physical design (PD) hierarchy at 112 and Map to PD structure+DFT at 114, to create physical design (PD) RTL or PD-VHDL 115. The physical design (PD) VHDL 115 undergoes physical design (PD) optimization at 116 resulting in and/or creating Netlist 120. The Netlist 120 is typically a specification of physical electronic components and how they are connected together. In its simplest form, a Netlist includes a list of the electronic components in a circuit and a list of the nodes to which the components are connected. The Netlist 120 can take different forms and provide different levels of detail, and in one or more embodiments can identify timing and/or slack point issues (e.g., a list of timing critical points).

The platform and/or system performing the stepwise refinement hardware design process can include one or more of APIs for implementing RTL transformation across the hardware design flow for separation of the different hardware design aspects or concerns: Bruce Wile, John Gross, and Wolfgang Roesner, "comprehensive Functional Verification: The Complete Industry Cycle", Morgan Kaufmann Publishers Inc., San Francisco, CA 2005; W. Roesner, "Aspect-Oriented Design—Optimizing SoC Verification via Separation of Concerns", $51^{st}$ Design Automation Conference, Austin, 2014; W. Roesner, "Software methods Meet Large-Scale System on a Chip Design", TCE 2015; M. H. Safieddine, F. A. Zaraket, R Kanj W. Roesner, and Ali Elzein, "Methodology for Separation of Design Concerns Using Conservative RTL Flipflop Inference", DVCon, San Jose, 2015; and M. H. Safieddine, F. A. Zaraket, R Kanj, A. El-Zein and W. Roesner, "Verification at RTL Using Separation of Design Concerns", *IEEE Transactions on Computer-Aided Design of Integrated Circuits and Systems*, Vol. 38, No. 8, pp. 1529-1542, August 2019

(hereinafter Ref. #1), each of which are incorporated by reference herein in their entirety. In an embodiment, optimizations, as discussed, for example, in Ref. #1 can be used to achieve fast turn-around requirements.

Also shown in FIG. 1 is the reverse engineering process 150 illustrated by the dotted arrows 155, starting from the Netlist 120 and tracing back to the PD-VHDL 115, back to the Normalized (NMZ) VHDL 110, and back to Root Cause Code 122, where the code lines written by the logic designer that are causing the problem(s), e.g., the flaw and/or bug, are identified. The stepwise refinement development process 105 and the reverse engineering process 150 in one or more embodiments are undertaken through the interaction of a client/user with system and/or platform 100 as illustrated in FIG. 1.

Figure 2:
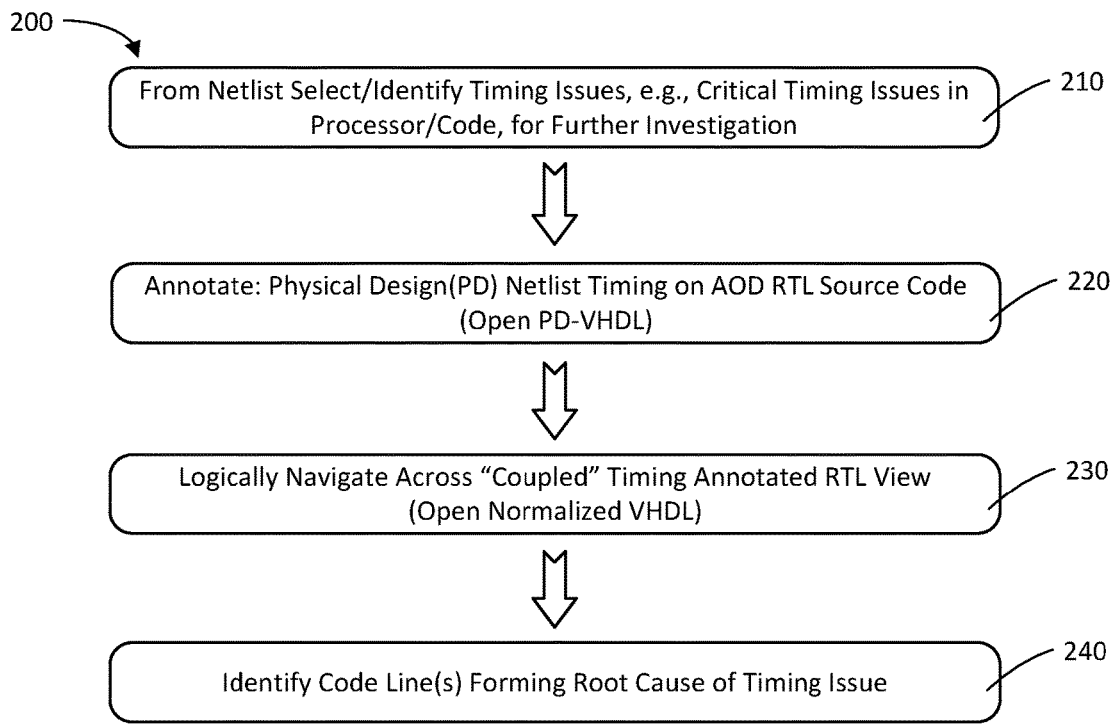
FIG. 2 shows a flow chart of a reverse engineering technique of a stepwise refinement design/development process for integrated circuits, microprocessors, and/or systems-on-a-chip (SoC) designs, according to an embodiment of the present disclosure, used for example to identify faulty and/or flawed code.

FIG. 2 outlines an exemplary flowchart in accordance with another embodiment illustrating and describing a method 200 of identifying flaws, issues, and/or bugs in an integrated circuit, e.g., a microprocessor and/or system-on-a-chip (SoC) design, preferably to assist with logic debug, and in an approach a method to reverse engineer the stepwise refinement EDA design process 105 to identify code having one or more potential flaws. While the method 200 is described for the sake of convenience and not with an intent of limiting the disclosure as comprising a series and/or a number of steps, it is to be understood that the process 200 does not need to be performed as a series of steps and/or the steps do not need to be performed in the order shown and described with respect to FIG. 2, but the process 200 can be integrated and/or one or more steps can be performed together, simultaneously, or the steps can be performed in the order disclosed or in an alternate order.

Process 200 provides traces the reverse engineering process 150 of FIG. 1. Process 200 starts at 210 with the Netlist that identifies timing issues, e.g., slack points, in the integrated circuit (e.g., the processor) and a particular timing issue (e.g., slack point) in the Netlist (e.g., Netlist 120) is selected for further investigation. In an embodiment, the worst timing issue (e.g., worst slack point) is selected for further investigation. In one or more approaches, the system/platform can be configured and/or a user can determine and select the timing issue or slack point to investigate. The manner in which timing issues are identified, presented, and/or displayed in the Netlist (e.g., Netlist 120) can vary. For example, a list can be provided identifying the timing issues, and the order in which the timing issues are presented on the list can be by severity of the timing issue where the most severe timing issues are listed first or at the top of the list. In an aspect, at 210 the node selected for further review is selected. In practice the system can select the candidate on the Netlist for further investigation, e.g., the entry on the list with the worst slack data, or a user can select the entry on the Netlist for further investigation.

At 220 process 200 continues where the timing issue selected for further investigation (e.g., the entry on the Netlist, the node, and/or the code region presenting timing issues) is traced back to the physical design (PD) VHDL. That is, in an approach the item selected from the netlist 120 (e.g., the node and/or code section) for investigation is traced back to the PD-VHDL, e.g., PD-VHDL 115 in FIG. 1 as part of process 150. The code section that was identified as potentially causing timing issue(s) and is being reviewed is annotated at 220 with slack time data. In this regard, at 220 the physical design (PD) netlist timing is annotated on RTL source code, e.g., the Aspect Oriented Design (AOD) RTL source code. In one or more embodiments, the second source of data, e.g., the VHDL code, in which to look for the problem being investigated is identified at 220. In an aspect, the PD-VHDL for the selected area of the code is opened at 220, preferably in a source browser, for viewing by the logic designer.

At 230, process 200 continues by logically navigating from PD-VHDL of the area of the code with potential issue(s) to normalized VHDL. That is at 230, the process navigates across "coupled" timing annotated RTL view to produce normalized VHDL of the code area potentially containing the faulty code. That is, at 230 the process logically navigates from PD VHDL 115 to normalized (NMZ) VHDL 110. In an aspect, the NMZ-VHDL for the selected area of the code is opened at 230, preferably in a source browser, for viewing by the logic designer.

Process 200 continues at 240 by tracing back from the normalized VHDL to Root Cause Code, which identifies the lines of code written by the logic designer which are resulting in the timing problem/issue. That is, at 240 the code line(s) forming the root cause of the specific timing issue being investigated are identified, e.g., from which the logic designer can look to debug the code. That is, at 240 the process traces back from NMZ-VHDL 110 to the code lines written by the logic designer that are causing the problems selected for investigation, e.g., the code lines responsible for the slack point being investigated.

It will be appreciated that while system and/or platform 100, and portions of system and/or platform 100, will be described by reference to certain microservices, modules, generators, and/or functional units, where the modules, generators, and/or functional units have programing, one or more APIs, one or more transforms, one or more databases, and/or one or more libraries, it can be appreciated that one or more different modules, different generators, and/or functional units can be included in system and/or platform 100, and that the modules, generators, and/or functional units can be combined and/or separated differently than illustrated in the figures and/or contain different programing, different APIs, different transforms, different databases, and/or different libraries than illustrated and/or described in this application.

Figure 3:
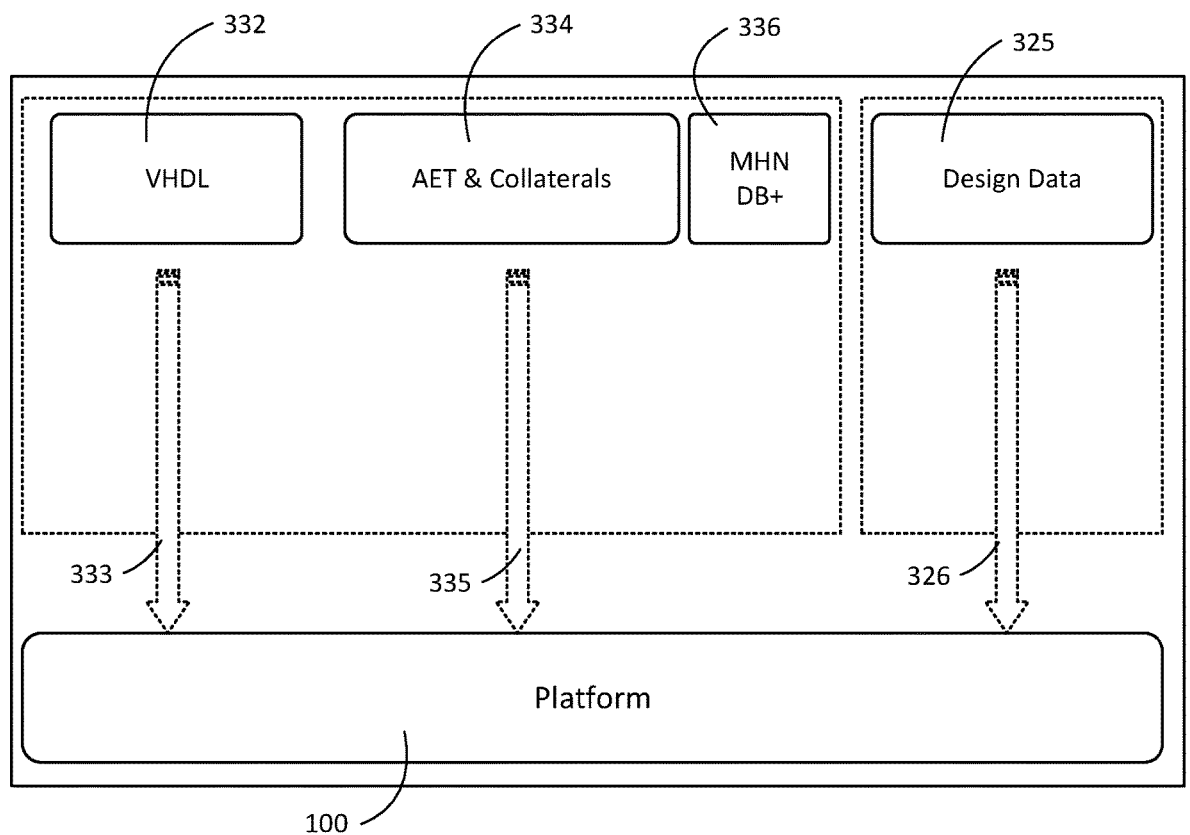
FIG. 3 shows a block diagram of design data and code inputs for a platform for identifying flaws in integrated circuits, microprocessors, and/or systems-on-a-chip (SoC) designs, according to an embodiment of the present disclosure.

FIG. 3 shows a block diagram of system and/or platform 100 receiving various data inputs. Platform 100 in one or more embodiments is a cloud native EDA platform that supports stepwise refinement-based hardware design flow 105 and reverse engineering and code flaw identifying process 150. In an approach, the stepwise refinement-based hardware design flow uses normalized (NMZ) RTL to capture the design intent of the integrated circuit (e.g., the processor), and in a further aspect uses automated transforms for the creation of PD-optimized RTL. The platform in an embodiment is a distributed platform that leverages cloud computing capabilities, and in an approach electronic design automation (EDA) tools and hardware design data co-exist as scalable, on-demand microservices. The platform 100 in one or more embodiments is used for collaborative hardware logic design and debug, and can support "session-based" hardware logic design and debug.

FIG. 3 illustrates hardware design data sources 325 as inputs 326 to platform 100. In one or more approaches the hardware design data sources 325 can be a Netlist of the current stage of the integrated circuit design. The hardware design data sources 325 can take many forms and can include RTL design data, compiled designs, RTL transforms, logic simulation data, Physical netlist Design (PD) in a concise binary form (DD), and post-silicon hardware dumps. Other inputs to platform 100 can include code description including hardware logic design. In an example, VHDL 332 can be input at 333 to platform 100. Other data can include All Event Trace (AET) data 334 input at 335 to platform 100. AET data 334 can include logic simulation stored as waveforms of logic value (0,1) over time (simulation cycles). Further input to platform 100 can include database services 336 providing correlation across the separated hardware aspects, for example, morphed aspects (MHN) MHNDB+. It can be appreciated that the data and inputs utilized during the reverse engineering process 150 to identify the code line(s) that are causing timing issues can be developed during the EDA stepwise refinement-based hardware design flow.

Figure 4:
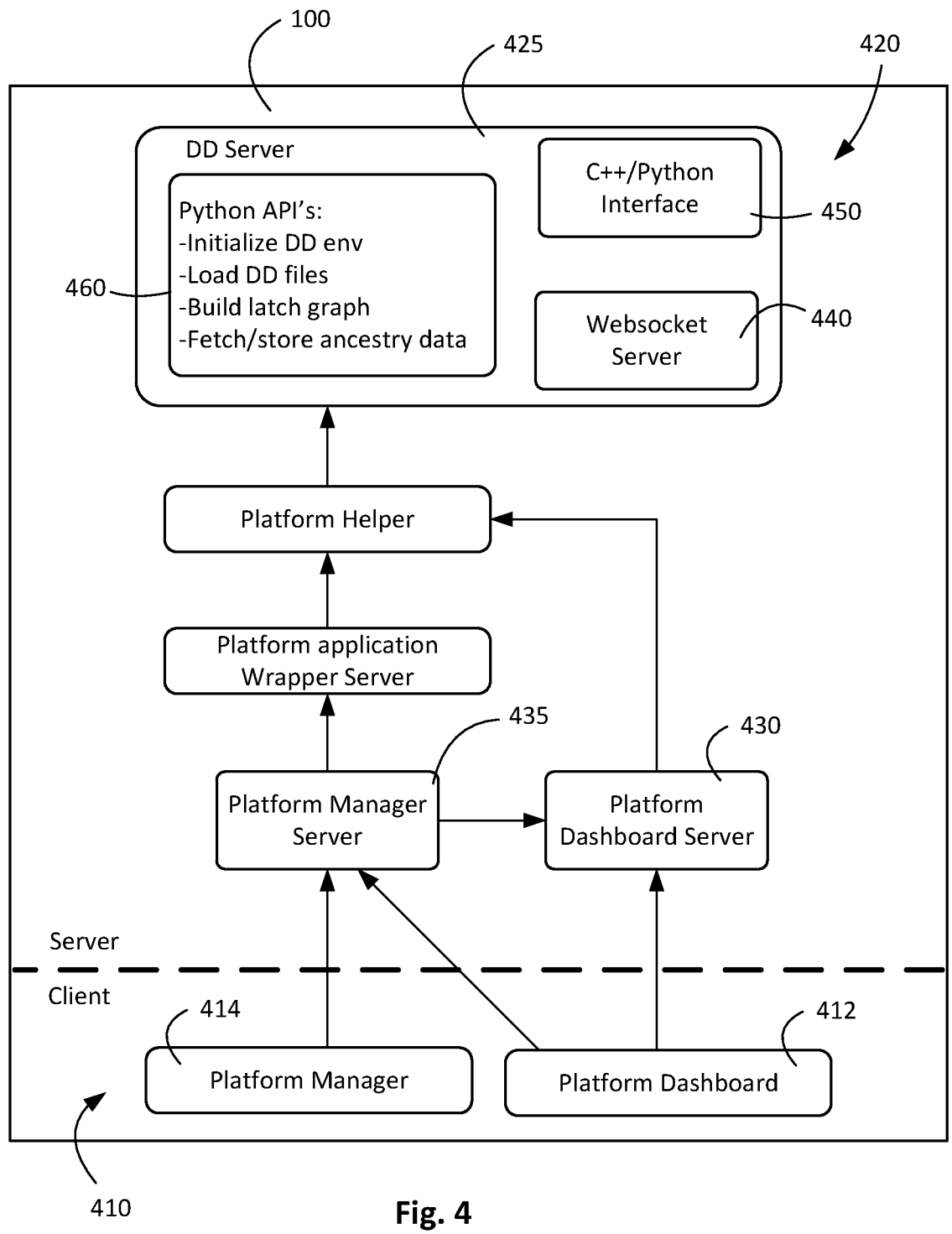
FIG. 4 shows a block diagram of a design data server for a platform for identifying flaws in integrated circuits, microprocessors, and/or systems-on-a-chip (SoC) designs, including client computing resources interacting with the design data server, according to an embodiment of the present disclosure.

Platform 100 can include client-side computing resources and server-side computing resources. FIG. 4 shows a portion of platform 100 including client-side computing resources 410 and server-side computing resources 420. The client-side computing resources 410 includes a Platform Dashboard 412 that can be displayed on a client computing device on which a client and/or user interacts by providing input to server-side computing resources 420, e.g., platform servers (e.g., DD server 425), and receiving information from server-side computing resources 420, e.g., platform servers (e.g., DD server 425), for display. Client-side computing resources 410 also includes Platform Manager 414 where multiple debug sessions can be created and managed. For example, Platform Manager 414 can create the session where a user can view through Platform Dashboard 412 each debug session including viewing the faulty code line(s) identified and/or performing the debugging process, for example via client computing device.

As shown in FIG. 4, server-side computing resources 420 include a Platform Dashboard Server 430 that interacts with Platform Dashboard 412 and a Platform Manager Server 435 that interacts with Platform Manager 414. Platform Dashboard Server 430 and Platform Manager Server 435 permit communication and interaction with DD Server 425. DD Server 425 includes a Websocket server 440, a coding interface 450 (e.g., C++/Python interface 450), and coding API's 460 (e.g., Python Application Interfaces (APIs) 460). The Python API's 460 initialize the DD server 425 envelope, load DD server files, build latch graphs, fetch/store ancestry data, etc.

Figure 5:
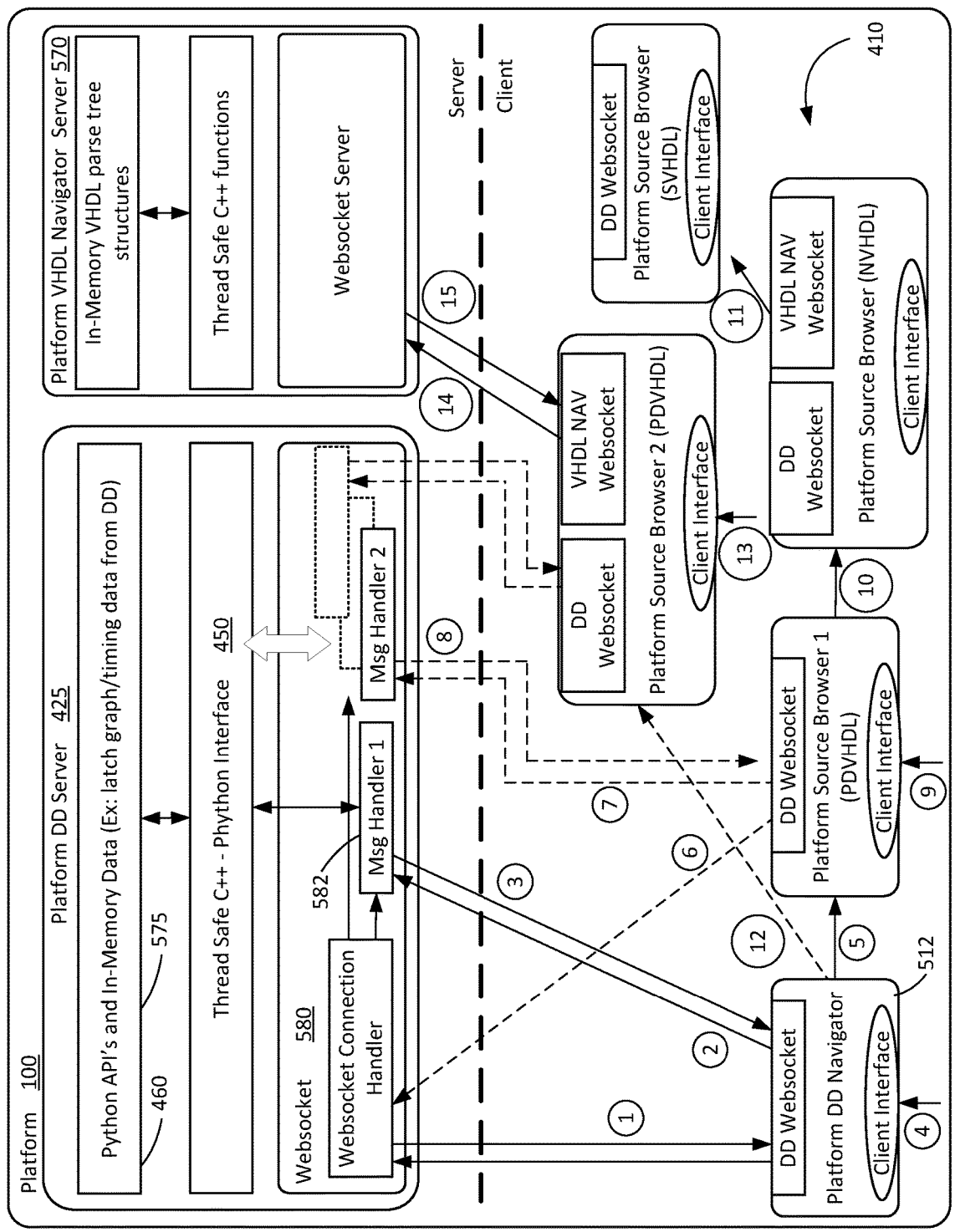
FIG. 5 shows a more detailed block diagram of a platform for identifying flaws in integrated circuits, microprocessors, and/or systems-on-a-chip (SoC) designs, including client/user side computing resources interaction and process flow with the hardware physical design data server and a hardware VHDL Navigator server, according to an embodiment of the present disclosure.

FIG. 5 illustrates a block diagram of Platform 100 and operation of a process to identify code line(s) containing faulty code and a further process of assisting with debug process by investigating, digging deeper, and obtaining additional information on the faulty code line(s). Platform 100 is a distributed platform or system that includes client computing resources 410 and server computing resources (e.g., server computing resources 420). Client computing resources 410 include one or more computing devices, for example as described in FIG. 9, that interact with server computing resources 420 through a network. Platform 100 in an embodiment is a cloud native EDA platform having EDA tools available as microservices and has computing resources distributed across the platform. For example, code runs on one or more client devices, for example running inside a browser of the client device, using the compute of the one or more client devices. The client computing resources 410 interacts with server computing resources 420 to transform data. Server computing resources 420 includes physical netlist Design Data (DD) server 425 for working with physical netlist hardware design data and VHDL Navigation Server 570 for working with and navigating through hardware VHDL code data. DD server 425 contains In-Memory data 575 on the hardware physical netlist and analysis data, including for example the Netlist 120 developed during the stepwise refinement-based hardware design process, and can include references to RTL design data, compiled designs, RTL transforms, logic simulation data, the actual physical netlist design data in concise binary form, and further inputs from the hardware dumps.

Figure 6:
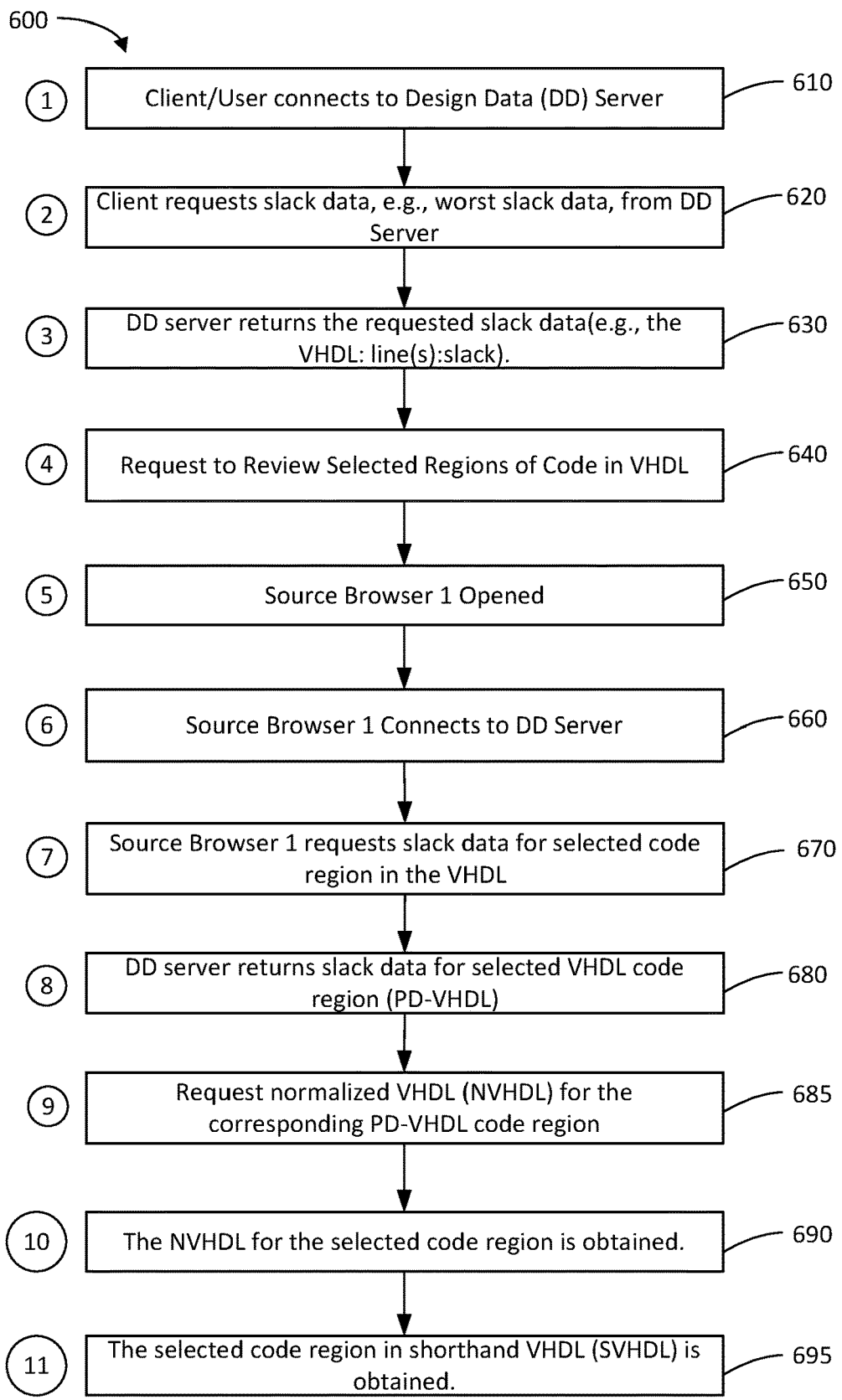
FIG. 6 shows a flow chart of a process to identify time critical flaws in VHDL, according to an embodiment of the present disclosure.

FIG. 6 outlines an exemplary flowchart in accordance with another embodiment illustrating and describing a method 600 of identifying flaws, issues, and/or bugs in an integrated circuit, e.g., a microprocessor and/or system-on-a-chip (SoC) design, preferably to assist with logic debug, and in an approach a method to reverse engineer the stepwise refinement EDA design process to identify code having one or more potential flaws. While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6 but the process 600 can be integrated and/or one or more steps can be performed together, simultaneously, or the steps can be performed in the order disclosed or in an alternate order.

The process 600 will be described with the assistance of FIG. 5. Process 600 starts at 610 with a client and/or user, preferably through a client computing device (e.g., computing device 512) and over a network, connecting to the DD server 425 as shown by "1" in FIG. 5. In the embodiment of FIG. 5 the client computing device 512 connects to the DD server 425 through websockets, e.g., through websocket server 580. As shown in FIG. 5 each client computing device 512 or each instance of client computing device 512 running on a browser, has its own message handler 582. It can be appreciated that other means beside websockets can be used to connect client computing resources 410 (e.g., client computing devices 512) to the Server-Side Computing Resources 420.

At 620, user computing device 512 requests slack data, e.g., data on those code regions where there are timing issues. This request at 620 is shown by "2" in FIG. 5. In a typical scenario, a user is trying to debug faulty code and is trying to identify the code that is contributing to the timing issues. In an example, the client computing device can request information on the worst slack points, which would identify those one or more regions of code (e.g., the lines of code) that have the worst timing issues. In one or more embodiments, the amount (e.g., the number) of timing issues (e.g., slack points) on which data is requested can be selectable by the user or the data requested can be determined through the programming. For example, a list of the top five slack point offenders, e.g., regions of code that are contributing the most to timing problem, can be requested, either by the user or through programming.

At 630 the DD server returns the requested slack data. The DD server 425 returning the timing slack data to the client computing device 512 is shown by "3" in FIG. 5. For example, at 630 the DD server can return information identifying the one or more regions in the second data source, e.g., the VHDL, causing timing issue(s). In one or more approaches, the DD server returns a list of one or more lines of the VHDL and the slack data for those particular VHDL code line(s). It should be recognized that one or more VHDL code lines could be contributing to the slack point, in which case the DD server can identify those one or more regions (e.g., line(s)) of code in the VHDL that are contributing to the slack point. The information returned by the DD server 425 at 630 preferably includes slack information, for example, an identification of the code region and the slack (measure of the timing issue) for that code region. The information returned at 630 can be in the form of a list, where in an arrangement the list can identify the one or more code regions (e.g., the one or more code regions in the VHDL) causing the slack and the amount of slack attributable to the identified code region. The information returned at 630 can be in the form of a list, and for a single slack point there may be one or more regions of code contributing to the timing issue, and the DD server can provide a list of those various code regions/lines for various slack points. The list returned at 630 can list the VHDL code regions (e.g., line(s) of VHDL code) arranged with slack points which have the greatest severity, e.g., the worst slack time/worst slack points, listed first. In other words, the list returned can by order of severity of slack time.

The user receives information at 630 identifying one or more region(s) of code (e.g., where each region can be one or more line(s) of code) which is causing slack (e.g., a timing issue(s)) and the user, for example, may want to investigate those regions of code causing the timing issue. At 640 the User (e.g., client computing resources) requests to review selected regions of code in the VHDL as shown by "4" in FIG. 5. That is, at 640 the user selects or identifies the code region, e.g., the VHDL, for further investigation. In operation, the user in one or more approaches can select any entry in the list provided at 630. This selection at 640 is akin to the selection at 210 in process 200 in FIG. 2.

At 650, a source browser is opened as shown by "5" in FIG. 5 and connects to DD server 425 at 660 as shown by "6" in FIG. 5. At 670, source browser 1 requests the slack timing data for the selected region of code in the VHDL as shown by "7" in FIG. 5. For example, the slack data for the VHDL line identified and selected at 640 for further investigation is provided, and/or supplied by source browser 1 to DD server 425 and that identified slack data for the VHDL line is requested at 670. At 680 the DD server returns the requested slack timing data for the selected region of VHDL code (e.g., for the VHDL line) as shown by "8" in FIG. 5. That is, in response to the request at 670, the code lines in PD-VHDL where the timing issues resides have been obtained and/or provided at 680 to the user, e.g., are viewable in source 1 browser on client computing device 512. At 680 the PD-VHDL 115 as shown in FIG. 1 is returned as the first leg of process 150 has been performed, and process 200 has gone from 210 where the timing issue selected for further investigation has been identified to 220 where the RTL code has been annotated and been transformed to PD-VDHL.

Process 600 continues at 685 where a user requests, as shown by "9" in FIG. 5, the normalized VHDL, e.g., NMZ-VHDL or NVHDL, for the corresponding PD-VHDL code region that were obtained and provided at 680. At 690 the NVHDL for the selected code region is obtained and for example opened in a NVHDL source browser, as shown by "10" in FIG. 5. Obtaining and opening up the selected code region, for example for further review for debug, as Normalized VHDL (NVHDL) at 690 is shown in FIG. 1 where PD-VHDL 115 is traced back and reverse engineered to Normalized VHDL (NVHDL) 110. In an embodiment the NVHDL source browser connects to and obtains the Normalized VHDL (NVHDL) from the VHDL Navigator Server 570. That is, at 690 a different source browser would connect to the VHDL Navigator Server 570, and navigate and open up the NVHDL in that different source browser, e.g., NVDHL source browser. At 695 process 600 continues where the selected code region in shorthand VHDL (SVHDL) is obtained, as shown by "11" in FIG. 5. Shorthand VHDL (SVHDL) is an abbreviated form of the code that the logic designer writes. That is, at 695 the SVHDL code for the corresponding NVHDL code is obtained and provided to the user, preferably through yet another source bowser interacting with the different platform servers. The different source browser, e.g., SVHDL source browser, is used to further navigate across the VHDL Navigator Server 570 and open up the SVHDL. The SVHDL corresponds to the Root Cause Code 122 in FIG. 1, and the step of tracing back or reverse engineering from Normalized VHDL or NVHDL 110 to Root Cause Code 122 is shown in FIG. 1. At this point, process 600 has reverse engineered the stepwise refinement-based hardware design process and identified the root cause SVHDL code, i.e., the code written by the logic designer, that results in the particular slack point that was identified and investigated.

Figure 7:
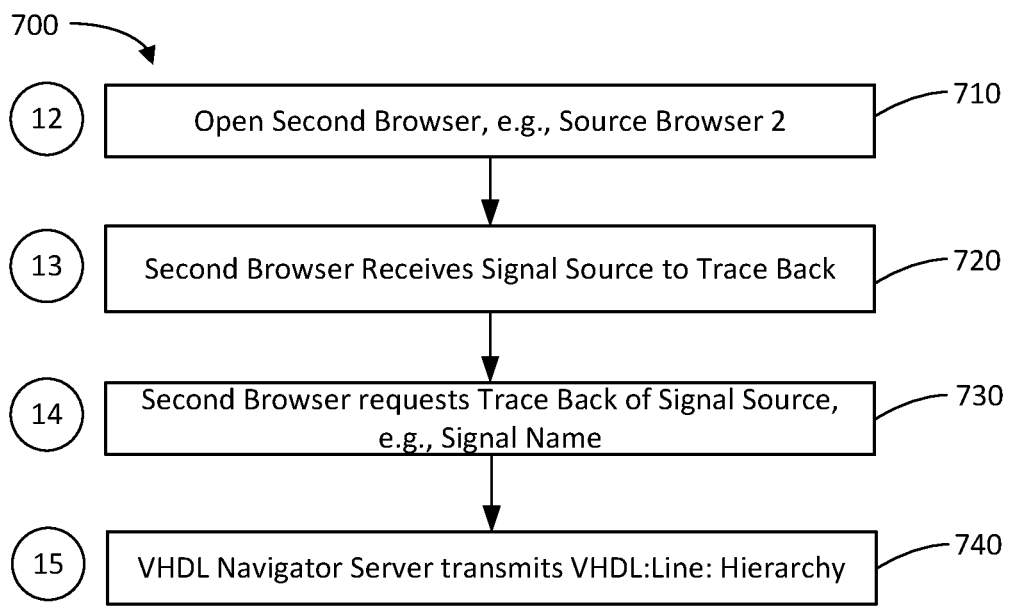
FIG. 7 shows a flow chart of a process to logically navigate VHDL, according to an embodiment of the present disclosure.

Additional features of platform 100 and processing can include the ability to obtain additional information regarding the root cause code, e.g., the potentially faulty or flawed code written by the logic designer that is causing the slack time issues. FIG. 7 outlines an exemplary flowchart in accordance with another embodiment illustrating and describing a method 700 of providing addition information regarding the flaws, issues, and/or bugs in an integrated circuit, e.g., a microprocessor and/or system-on-a-chip (SoC) design, preferably to assist with logic debug, and in an approach a method 700 to provide additional information regarding the root cause code identified as responsible, at least in part, for the slack time issues being investigated. While the method 700 is described for the sake of convenience and not with an intent of limiting the disclosure as comprising a series and/or a number of steps, it is to be understood that the process 700 does not need to be performed as a series of steps and/or the steps do not need to be performed in the order shown and described with respect to FIG. 7 but the process 700 can be integrated and/or one or more steps can be performed together, simultaneously, or the steps can be performed in the order disclosed or in an alternate order.

In process 700, the user typically is interested in getting additional information on certain parts of the code, e.g., parts of the code that might be providing a large portion of the slack, or portions of the code that are providing more slack time than anticipated. In the process 700, at 710 a second source browser, e.g., Source Browser 2, is opened as shown by "12" in FIG. 5. In an embodiment the second browser is connected to the DD server 425 and the VHDL server 570. The second browser receives at 720 the signal source to trace back, e.g., the SVHDL code that the user wants to obtain additional information on, for example, to debug that portion of code. The signal source to trace back and input to the second browser is shown by "13" in FIG. 5. In an embodiment the user, through the user computing device 512, selects and identifies the code, e.g., original code (SVHDL) written by the logic designer, on which additional information is requested, and at 720 that selected code, e.g., signal source/name), is provided to the second browser, e.g., Source Browser 2.

At 730, a request is sent from the second source browser to the VHDL Navigation Server 570 to trace back the signal source, e.g., the original logic designer's written code, to obtain the next layer of information. For example, at 730, second browser, e.g., Source Browser 2, can request from the VHDL Navigation Server 570 the signal source (e.g., signal name/lines of VHDL code) to trace back as shown by "14" in FIG. 5. In a specific example, the second browser, e.g., Source Browser 2, can request the Normalized VHDL (NVHDL) code of the corresponding SVHDL code of the slack point that is of interest, or the second browser can request the PD-VHDL code of the corresponding NVHDL code that is, for example of interest. At 740, in response to the request to trace back a signal at 730, the requested VHDL line is provided by the VHDL server 570 as shown by "15" in FIG. 5. For example, at 740, depending upon the requested information, additional information on the NVHDL code lines is provided or additional information on the PD-VHDL code lines are provided.

The signal source to trace back, and the point during the process 600 at which a user might request additional information, can vary. For example, a user can request to trace back from the shorthand VHDL (SVHDL) code, e.g., Root Cause Code 122, to the corresponding normalized VHSL (NVSHL), e.g., Normalized VHDL 110, to obtain additional information and/or annotations on the code to assist with the debug process. So, for example, the user could run process 600 from 610-695 to obtain a SVHDL code (Root Cause code) for a slack point that is of interest, and then trace that SVHDL back to get the corresponding NHVDL code. After tracing back the VSHDL code of a slack point that is of interest to its corresponding NVHDL code using the process steps 710-740, the corresponding NVHDL code can be traced back even further again using process 710-740 to obtain the corresponding PD-VHDL code. Alternatively, or additionally, process 600 can be run from 610-690 where the NVDHL code for the slack point of interest is obtained, and the user might desire to obtain further information on that corresponding portion of the code, and the user can opt to open a second source browser, e.g., Source Browser 2, after performing step 690 to obtain additional information on the slack point that is being investigated. The Platform 100 has the ability to transform between the SVHDL for a slack point of interest and a corresponding NVHDL for the slack point of interest, and to also transform between the NVHDL for the slack point of interest and a corresponding PD-VHDL, preferably by hitting an entry on the user's computing device display. While the platform 100 and processes 150, 200, 600, and 700 have been described with reference to a slack point of interest and debugging a slack point at interest, it can be appreciated that the disclosure goes beyond the reasons or rationale for obtaining the desired information and/or reverse engineering or tracing back the design data and code transformations.

The co-navigation flow and platform(s) described herein preferably are based upon a microservices platform. Techniques are employed for improved correspondence and coverage while trying to "back annotate" the physical design data onto the different RTL transform source. Microservice based techniques are also used for enabling line to line correspondence across the different RTL transforms, e.g., PD-VHDL, NMZ-VHDL, and S-VHDL, when applicable.

It will be understood that one or more blocks of the flowchart illustrations in FIGS. 1-2 & 6-7 and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Figure 8:
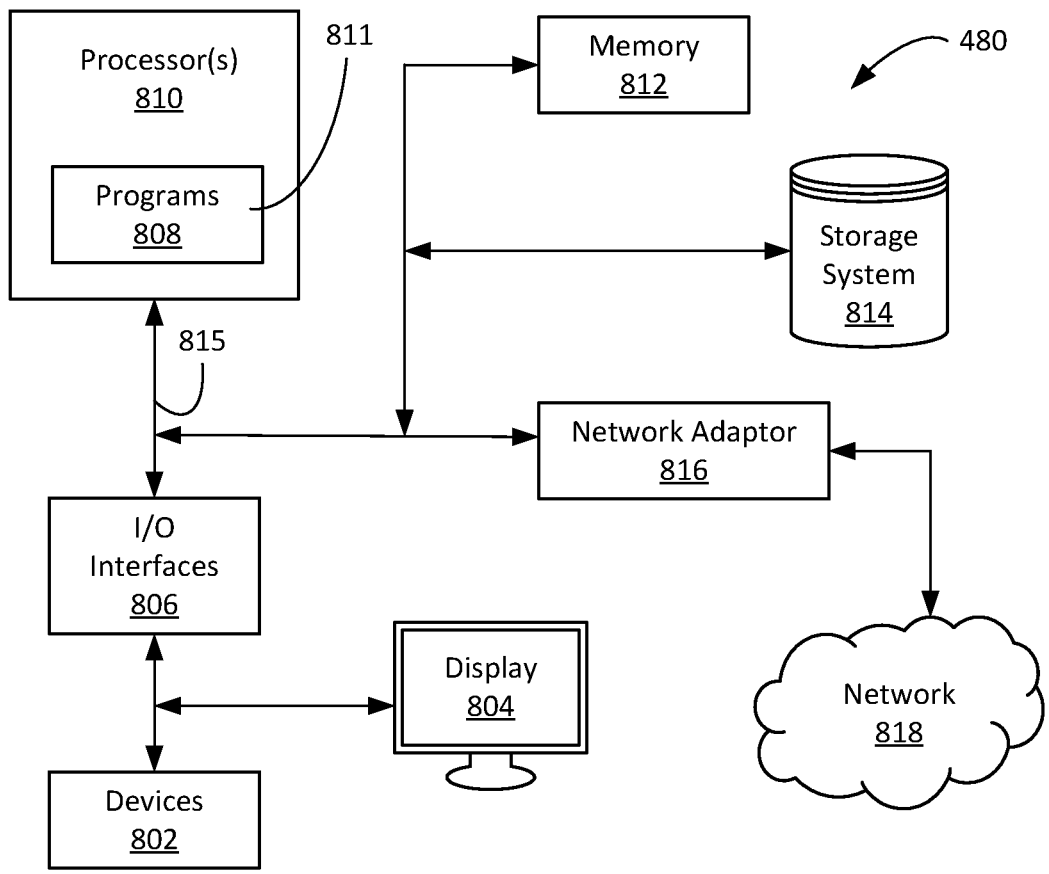
FIG. 8 is an overview block diagram of an exemplary computer system which a user may use to implement the present disclosure of identifying flaws and/or bugs in integrated circuits, microprocessors, and/or systems-on-a-chip (SoC) designs.

FIG. 8 illustrates an example computing device and/or data processing system 800 in which aspects of the present disclosure may be practiced. It is to be understood that the computing device and/or data processing system 800 depicted is only one example of a suitable computing and/or processing system and is not intended to suggest any limitation as to the scope of use or functionality of embodiments of the present invention. For example, the system shown may be operational with numerous other special-purpose computing system environments or configurations. Examples of well-known computing devices, systems, platforms, environments, and/or configurations that may be suitable for use in the present disclosure may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include any of the above systems or devices, and the like.

In some embodiments, the computer device and/or system 800 may be described in the general context of computer system executable instructions, embodied as program modules stored in memory 812, being executed by the computer system. Generally, program modules may include routines, programs, objects, components, logic, data structures, and so on that perform particular tasks and/or implement particular input data and/or data types in accordance with the present invention.

The components of the computer system 800 may include, but are not limited to, one or more processors or processing units 810, a memory 812, and a bus 815 that operably couples various system components, including memory 812 to processor 810. In some embodiments, the processor 810, which is also referred to as a central processing unit (CPU) or microprocessor, may execute one or more programs or modules 808 that are loaded from memory 812 to local memory 811, where the program module(s) embody software (program instructions) that cause the processor to perform one or more operations. In some embodiments, module 808 may be programmed into the integrated circuits of the processor 810, loaded from memory 812, storage device 814, network 818 and/or combinations thereof to local memory.

The processor (or CPU) 810 can include various functional units, registers, buffers, execution units, caches, memories, and other units formed by integrated circuitry, and may operate according to reduced instruction set computing ("RISC") techniques. The processor 810 processes data according to processor cycles, synchronized, in some aspects, to an internal clock (not shown). Bus 815 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer device and/or system 800 may include a variety of computer system readable media, including non-transitory readable media. Such media may be any available media that is accessible by the computer system, and it may include both volatile and non-volatile media, removable and non-removable media.

Memory 812 (sometimes referred to as system or main memory) can include computer readable media in the form of volatile memory, such as random-access memory (RAM), cache memory and/or other forms. Computer system 800 can further include other removable/non-removable, volatile/non-volatile computer system storage media. By way of example only, storage system 814 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 815 by one or more data media interfaces.

The computer system may also communicate with one or more external devices 802 such as a keyboard, track ball, mouse, microphone, speaker, a pointing device, a display 804, etc.; one or more devices that enable a user to interact with the computer system; and/or any devices (e.g., network card, modem, etc.) that enable the computer system to communicate with one or more other computing devices. Such communication can occur via Input/Output (I/O) interfaces 806. Communications or network adapter 816 interconnects bus 815 with an outside network 818 enabling the data processing system 800 to communicate with other such systems. Additionally, an operating system such as, for example, AIX ("AIX" is a trademark of the IBM Corporation) can be used to coordinate the functions of the various components shown in FIG. 8.

The computer system 800 can communicate with one or more networks 818 such as a local area network (LAN), a general wide area network (WAN), and/or a public network (e.g., the Internet) via network adapter 816. As depicted, network adapter 816 communicates with the other components of computer system via bus 815. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 9:
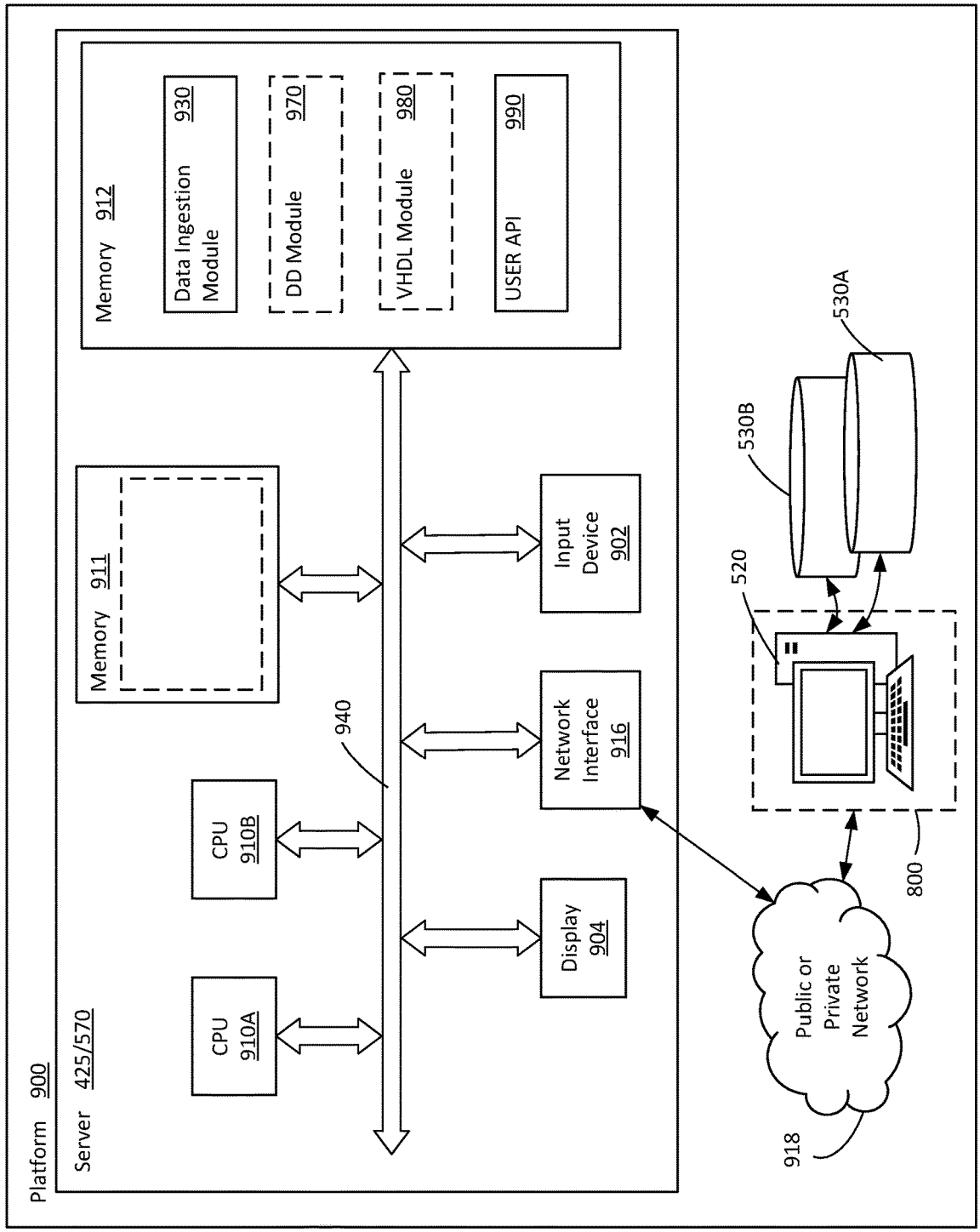
FIG. 9 is an overview block diagram of an exemplary computer system or platform on which the present disclosure of identifying flaws and/or bugs in integrated circuits, microprocessors, and/or systems-on-a-chip (SoC) designs may be practiced according to an embodiment.

FIG. 9 illustrates a platform and/or system 900 configured and programmed to design, verify and/or test integrated circuits, preferably microprocessors and/or SoC, and in an embodiment to test for and/or identify flaws, problems, and/or bugs in integrated circuits, including in an approach providing additional information on code sections, to, for example assist with debugging the integrated circuit and code, and on which the present disclosure can be practiced. According to an embodiment, platform/system 900 includes one or more computing devices 800 configured to be usable by a user/client to identify flaws, problems, and/or bugs in integrated circuits, including code, connectable to one or more servers, e.g., DD Server 425 and/or VHDL Navigation Server 570. In one or more aspects, platform or system 900 can include, for example, mainframe computers, servers, distributed cloud computing environments, thin clients, thick clients, personal computers, PC networks, laptops, tablets, mini-computers, multiprocessor-based systems, microprocessor-based systems, smart devices, smart phones, set-top boxes, programmable electronics, or any other similar computing device.

Servers 425/570 can be or have a cloud-based server, and can include one or more hardware processors 910A, 910B (also referred to as central processing units (CPUs)), a memory 912, e.g., for storing an operating system, application program interfaces (APIs) and programs, a network interface 916, a display device 904, an input device 902, and any other features common to a computing device, including a server. Further, as part of server 424/570, there is provided a local memory 911 and/or an attached memory storage device (not shown).

In one or more aspects, server 425/570 may, for example, be any computing device that is configured to communicate with one or more web-based or cloud-based computing devices 800 over a public or private communications network 918. For instance, information regarding the integrated circuits for testing and debugging may be contained on one or more servers 425/570 that are remote from client computing devices 800.

In the embodiment depicted in FIG. 9, processors 910A, 910B may include, for example, a microcontroller, Field Programmable Gate Array (FPGA), or any other processor that is configurable to perform operations according to instructions in software programs as described below. These instructions may be stored, for example, as programmed modules in memory storage device 912. Communication channels 940, e.g., wired connections such as data bus lines, address bus lines, Input/Output (I/O) data lines, video bus, expansion busses, etc., are shown for routing signals between the various components of servers 425/570.

Network interface 916 is configured to transmit and receive data or information to and from server 425/570, e.g., via wired or wireless connections. For example, network interface 916 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 800 to transmit information to or receive information from server 425/570.

Display 904 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 904 may include a liquid crystal display (LCD), an e-paper/e-ink display, an organic LED (OLED) display, or other similar display technologies. In one or more aspects, display 904 may be touch-sensitive and may also function as an input device. Input device 902 may include, for example, a keyboard, a mouse, a touch-sensitive display, a keypad, a microphone, a camera, or other similar input devices or any other input devices that may be used alone or together to provide a user with the capability to interact with the server 425/570.

Memory 912 may include, for example, non-transitory computer readable media in the form of volatile memory, such as random-access memory (RAM) and/or cache memory or others. Memory 912 may include, for example, other removable/non-removable, volatile/non-volatile storage media. By way of non-limiting examples only, memory 912 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Memory 912 of servers 425/570 store one or more modules that include, for example, programmed instructions adapted to test integrated circuits, e.g., microprocessors and/or SoCs, for example to identify flaws and/or bugs according to one or more embodiments of the disclosure. In one embodiment, one of the programmed processing modules stored at the associated memory 912 includes a data ingestion module 930 that provide instructions and logic for operating circuitry to access/read large amounts of data (e.g., normalized (NMZ) register transfer level (RTL) information, hardware dump) for use by other modules that process and analyze the data to test for and identify flaws in, for example, hardware designs, e.g., integrated circuits, processors, and/or SoC.

In one or more embodiments, system, or platform 900, e.g., memory in servers, contains the different hardware design data of the hardware design, e.g., the integrated circuit, processor or SoC, in a DD Module 970 or preferably distributed throughout platform 900. For example, memory 912 in server 415 contains the Netlist on the circuit under development or be subject to a debugging process, references or pointers to the RTL design data, compiled designs, RTL transforms, logic simulation data, actual physical netlist design and analysis data in a concise binary form, and additional data from post-silicon hardware dumps. Memory 912 in server 570 contains, for example, RTL information including VHDL code, and various transformations of the code during the development and debugging process where flaws in the circuits and coding logic are being identified. For example, memory 912 contains VHDL data in VHDL Module 980.

Servers 425/570 optionally includes a supervisory program having instructions and logic for configuring the Platform 900, including the servers 425/570 to call one or more, and in an embodiment all, of the program modules and invoke the operations of system/platform 900. In an embodiment, such supervisory program calls provide application program interfaces (APIs) for running the programs. At least one application program interface (API) 990 is invoked in an embodiment to receive input data, e.g., design data on the hardware and/or VHDL coding on the integrated circuit to be tested and debugged. The system 900 in an embodiment produces and/or identifies sections of code that are faulty and/or otherwise cause slack time errors, which can be reviewed by the user, including logic designers to debug the circuit and coding.

In one or more embodiments, platform 100/900 can be a distributed computing system, for example using cloud computing capabilities and/or features. Cloud computing is a model of service delivery for enabling convenient, on-demand network access to a shared pool of configurable computing resources (e.g., networks, network bandwidth, servers, processing, memory, storage, applications, virtual machines, and services) that can be provisioned and released through a service provider or vendor. This model can include one or more characteristics, one or more service models, and one or more deployment models. Characteristics can include, for example, on-demand service; broad network access; resource pooling; rapid elasticity; and/or measured services. Service models can include, for example, software as a Service (SaaS), Platform as a Service (PaaS), and/or Infrastructure as a Service (IaaS). Deployment models can include, for example, private cloud; community cloud; public cloud; and/or hybrid cloud. A cloud computing environment is typically service oriented with a focus on statelessness, low coupling, modularity, and semantic interoperability. Typically, at the heart of cloud computing is an infrastructure that includes a network of interconnected nodes. Platform 100 and/or Platform 900 can take advantage of cloud computing to protect sensitive data when subject to a processing chain by one or more computing resources or nodes.

Figure 10:
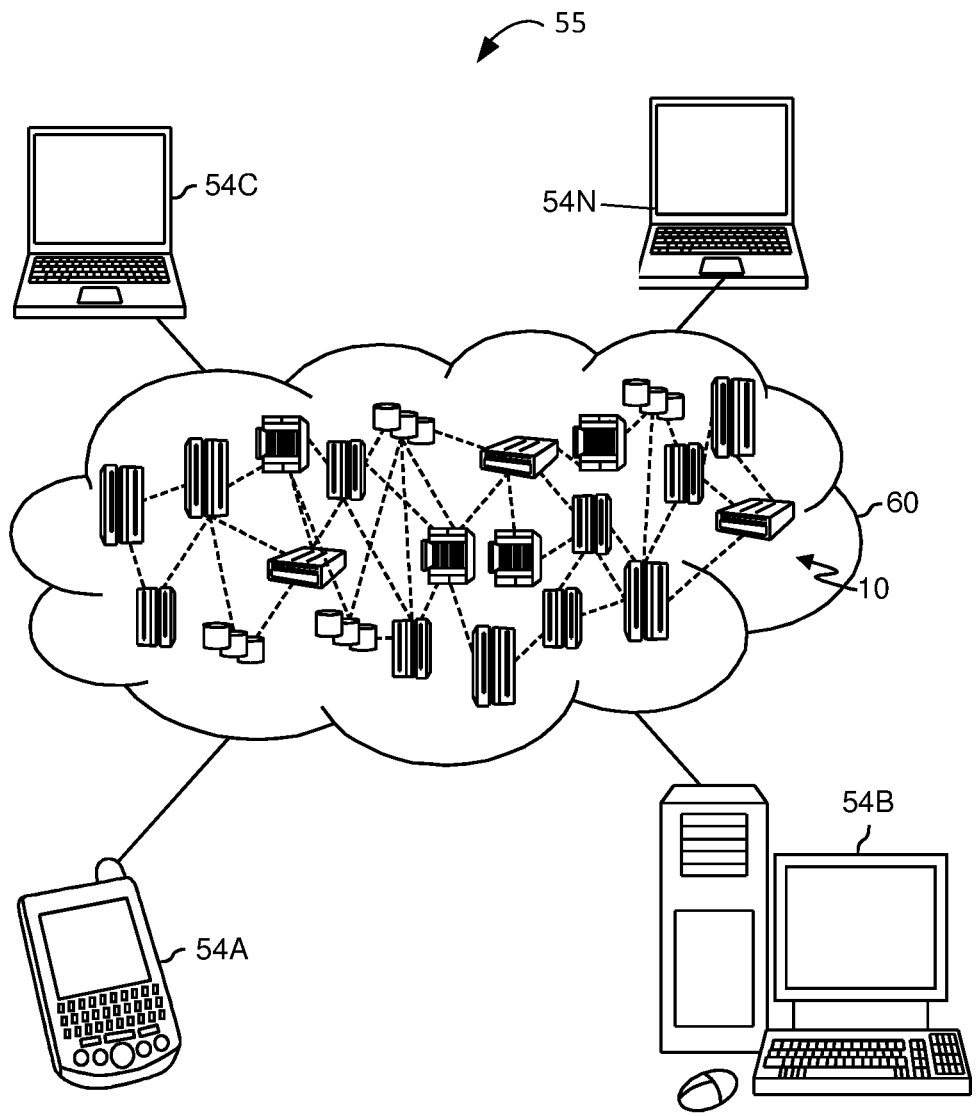
FIG. 10 depicts a cloud computing environment according to an embodiment of the disclosure.

Referring now to FIG. 10, illustrative cloud computing environment 55 is depicted. As shown, cloud computing environment 55 includes one or more cloud computing nodes 10 with which local computing devices used by cloud consumers (e.g., client computing devices 512), such as, for example, personal digital assistant (PDA) or mobile (smart) telephone 54A, desktop computer 54B, laptop computer 54C, and/or servers 54N may communicate. Nodes 10 may communicate with each other. They may be grouped (not shown) physically or virtually, in one or more networks, such as Private, Community, Public, or Hybrid clouds, or a combination thereof. This allows cloud computing environment 55 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 55 can communicate with any type of computerized device over any type of network and/or network addressable connection (e.g., using a web browser). Client computing resources 410 and/or Server-side computing resources 420 (including servers 425 and/or 570) can constitute or include computing resources 54 (e.g., 54A-54N) shown in FIG. 10.

Figure 11:
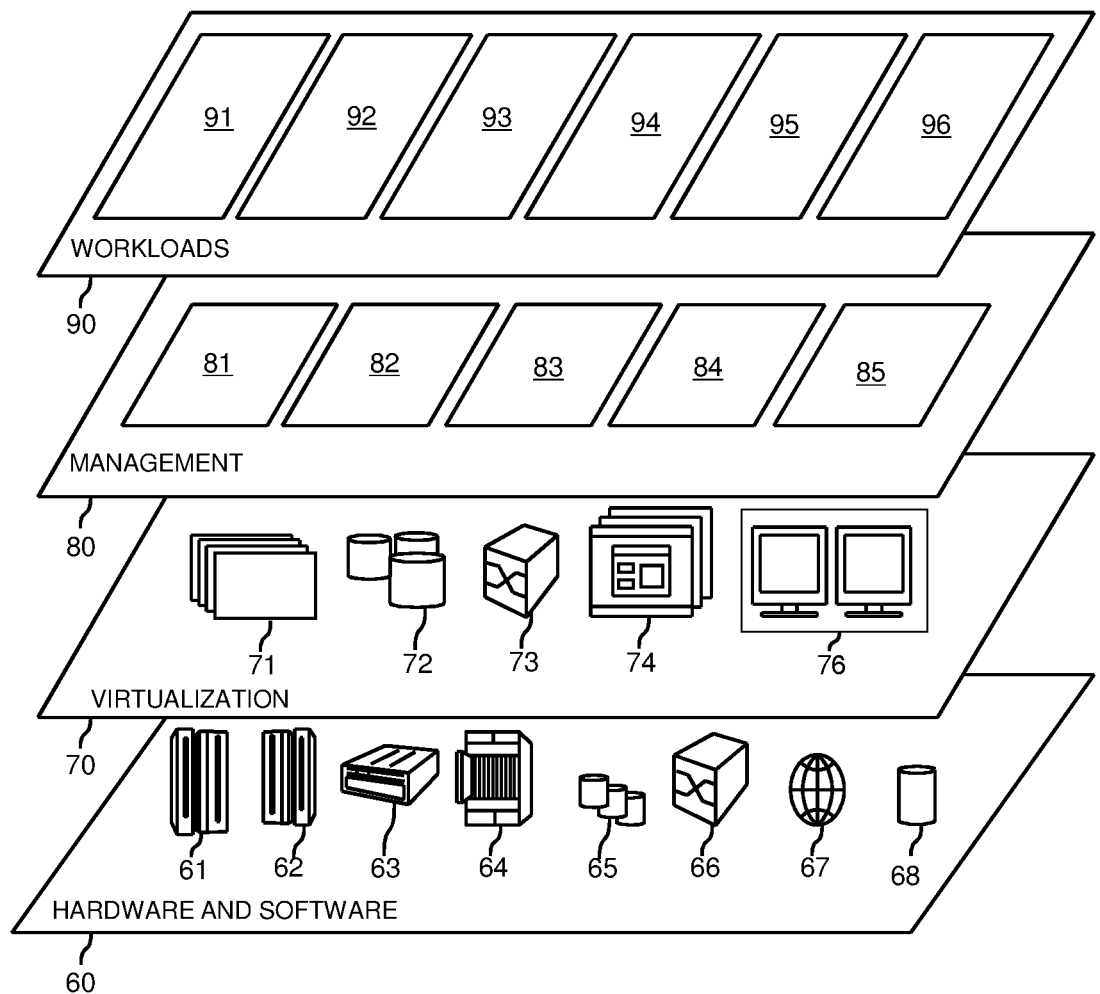
FIG. 11 depicts abstraction model layers of a cloud computing environment according to an embodiment of the disclosure.

Referring to FIG. 11, a set of functional abstraction layers provided by cloud computing environment 55 (FIG. 10) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components can include: mainframes 61; RISC (Reduced Instruction Set Computer) architecture based servers 62; servers 63; blade servers 64; storage devices 65; and network and networking components 66. In some embodiments, software components include network application server software 67 and database software 68.

Virtualization layer 70 provides an abstraction layer from which the flowing examples of virtual entities may be provided: virtual servers 71; virtual storage 72; virtual networks 73, including virtual private networks; virtual applications and virtual operating systems 74; and virtual clients 76.

In one example, management layer 80 may provide the functions described below. Resource provisioning 81 provides procurement, preferably dynamic procurement, of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. Other functionality as illustrated by workload layer 96 is contemplated.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying flaws in an integrated circuit, the method comprising:
   selecting from a list of a plurality of timing issues in an integrated circuit, where each timing issue on the list is represented by one or more VHDL code lines, a particular timing issue to investigate;
   next tracing back the one or more VHDL code lines, corresponding to the selected particular timing issue to investigate, to one or more physical design VHDL (PD-VHDL) code lines;
   next logically navigating across the one or more PD-VHDL code lines, corresponding to the selected particular timing issue to investigate, to one or more corresponding normalized VHDL (NVDHL) code lines; and
   next tracing back the one or more corresponding NVDHL code lines to one or more short-hand VHDL (SVHDL) code lines to identify one or more code lines, written by a code designer, responsible for the particular timing issue being investigated.

2. The method of claim 1, wherein the timing issue with the worst slack time is selected as the particular timing issue to investigate.

3. The method of claim 1, further comprising designing the integrated circuit through a stepwise refinement-based hardware design process.

4. The method of claim 1, further comprising creating, by server-side computing resources, the list identifying the plurality of timing issues, wherein the list comprises timing slack data for the integrated circuit.

5. The method of claim 1, wherein a user selects the particular timing issue to investigate.

6. The method of claim 1, further comprising:
   opening a first source browser in a user computing device; and
   connecting the first source browser to server-side computing resources.

7. The method of claim 6, wherein tracing the one or more VHDL code lines, corresponding to the selected particular timing issue to investigate, to one or more PD-VHDL code lines, comprises:
   obtaining timing slack data for the one or more VHDL code lines being investigated; and annotating the one or more VHDL code lines being investigated with the obtained timing slack data to form the one or more PD-VHDL code lines.

8. The method of claim 7, wherein obtaining timing slack data for the one or more VHDL code lines being investigated comprises:
   requesting, by the first source browser from the server-side computing resources, the timing slack data for the one or more VHDL code lines being investigated; and
   returning, by the server-side computing resources, the timing slack data for the one or more VHDL lines being investigated.

9. The method of claim 7, wherein the timing slack data is obtained from the server-side computing resources.

10. The method of claim 6, further comprising opening in a second source browser the one or more NVHDL code lines corresponding to the one or more PD-VHDL code lines.

11. The method of claim 10, further comprising:
   opening the one or more PD-VHDL code lines corresponding to the one or more VHDL code lines being investigated in the first browser; and
   navigating by the second source browser a VHDL navigation server to trace back the one or more PD-VHDL code lines to the one or more corresponding NVHDL code lines.

12. The method of claim 10, further comprising:
   connecting a third source browser to the server-side computing resources;
   navigating the server-side computing resources to trace back the one or more corresponding NVHDL code lines to the one or more SVHDL code lines; and
   opening the one or more SVHDL code lines in the third source browser.

13. The method of claim 1, wherein after identifying the one or more code lines, written by a code designer, responsible for the particular timing issue being investigated, the method further comprises obtaining additional information on the particular timing issue being investigated, wherein obtaining additional information on the particular timing issue being investigated comprises:
   connecting an additional server to the server-side computing resources;
   receiving, by the additional source browser, a signal source to trace back;
   requesting, by the additional source browser, the server-side computing resources to trace back the signal source to a next layer of VDHL code;
   receiving, by the additional source browser, from the server-side computing resources the next layer of VHDL code; and
   opening in the additional source browser the next layer of VHDL code.

14. The method of claim 1, wherein the signal source is one or more SVHDL code lines and the next layer of VHDL code is one or more corresponding NVHDL code lines.

15. A system for identifying flaws in a processor, the system comprising:
   a non-transitory memory storage device storing program instructions; and
   one or more processors having circuitry and logic to execute said program instructions, wherein the one or more processors are in communication with said memory storage device and in response to executing said program instructions the one or more processors are configured to:
   select from a list of a plurality of timing issues in the processor, where each timing issue on the list is represented by one or more VHDL code lines, a particular timing issue to investigate;
   next trace back the one or more VHDL code lines, corresponding to the selected particular timing issue to investigate, to one or more physical design VHDL (PD-VHDL) code lines;
   next logically navigate across the one or more PD-VHDL code lines, corresponding to the selected particular timing issue to investigate, to one or more corresponding normalized VHDL (NVDHL) code lines; and
   next trace back the one or more corresponding NVDHL code lines to one or more short-hand VHDL (SVHDL) code lines to identify one or more code lines, written by a code designer, responsible for the particular timing issue being investigated.

16. The system of claim 15, wherein the program instructions, in response to being executed by the one or more processors, further configures the one or more processors to:
   open a first source browser in a user computing device; and
   connect the first source browser to server-side computing resources.

17. The system of claim 16, wherein the program instructions, in response to being executed by the one or more processors, further configures the one or more processors to:
   request, by the first source browser from a design data server, the timing slack data for the one or more VHDL code lines being investigated; and
   return, by the design data server, the timing slack for the one or more VHDL code lines being investigated,
   wherein the server-side computing resources comprises the design data server and the design data server stores hardware design data on the processor being investigated, wherein the hardware design data comprises a Netlist of the current stage of the processor design, RTL design data, compiled designs, RTL transforms, logic simulation data, Physical netlist Design (PD) in a concise binary form (DD), and post-silicon hardware dumps.

18. The system of claim 17, wherein the program instructions, in response to being executed by the one or more processors, configures the one or more processors to:
   obtain timing slack data for the one or more VHDL code lines being investigated;
   annotate the one or more VHDL code lines being investigated with the obtained timing slack data to form the one or more PD-VHDL code lines; and
   open the one or more PD-VHDL code lines in the first source browser.

19. The system of claim 18, wherein the program instructions, in response to being executed by the one or more processors, configures the one or more processors to:
   open a second source browser in the user computing device;
   connect the second source browser to the design data server;
   connect the second source browser to a VHDL navigation server;
   trace back the one or more PD-VHDL codes lines to the one or more corresponding NVHDL code lines by navigating the VHDL navigation server with the second source browser; and
   open the one or more corresponding NVHDL code lines in the second browser, wherein the server-side computing resources comprises the VHDL navigation server and the VHDL navigation server stores code description including hardware logic design, wherein the hardware logic design comprises VHDL, Verilog, and All Event Trace (AET) data.

20. The system of claim 19, wherein the program instructions, in response to being executed by the one or more processors, configures the one or more processors to:
open a third source browser in the user computing device;
connect the third source browser to the design data server;
connect the third source browser to the VHDL navigation server;
trace back the one or more corresponding NVHDL codes lines to the one or more corresponding SVHDL code lines by navigating the VHDL navigation server with the third source browser; and
open the one or more corresponding SVHDL code lines in the third browser.

* * * * *